(12) United States Patent
Jung et al.

(10) Patent No.: US 11,817,564 B2
(45) Date of Patent: Nov. 14, 2023

(54) ACTIVE MATERIAL ANALYSIS APPARATUS

(71) Applicant: LG Chem, Ltd., Seoul (KR)

(72) Inventors: Yeon Wook Jung, Daejeon (KR); Sung Joon Oh, Daejeon (KR)

(73) Assignee: LG Chem, Ltd.

( * ) Notice: Subject to any disclaimer, the term of this patent is extended or adjusted under 35 U.S.C. 154(b) by 185 days.

(21) Appl. No.: 16/769,126

(22) PCT Filed: Sep. 18, 2019

(86) PCT No.: PCT/KR2019/012090
§ 371 (c)(1),
(2) Date: Jun. 2, 2020

(87) PCT Pub. No.: WO2020/060200
PCT Pub. Date: Mar. 26, 2020

(65) Prior Publication Data
US 2021/0328273 A1 Oct. 21, 2021

(30) Foreign Application Priority Data

Sep. 19, 2018 (KR) .................. 10-2018-0111967
Sep. 17, 2019 (KR) .................. 10-2019-0114218

(51) Int. Cl.
H01M 10/42 (2006.01)
H01M 4/505 (2010.01)
(Continued)

(52) U.S. Cl.
CPC ........ H01M 10/4285 (2013.01); G01N 21/65 (2013.01); H01M 4/505 (2013.01);
(Continued)

(58) Field of Classification Search
CPC . G01N 21/65; G01N 2021/651; H01M 4/505; H01M 4/525; H01M 10/44;
(Continued)

(56) References Cited

U.S. PATENT DOCUMENTS

| 5,635,138 A | 6/1997 | Amatucci et al. |
| 2003/0157409 A1 | 8/2003 | Huang |

(Continued)

FOREIGN PATENT DOCUMENTS

| CN | 102721578 A | 10/2012 |
| CN | 104393223 A | 3/2015 |

(Continued)

OTHER PUBLICATIONS

KR20080012438A, machine English translation, Lee Wan Jin, et al., "Electrochemical Test In-Situ Cell for X-Ray Absorption Spectroscopy", accessed from https://worldwide.espacenet.com/ Date: Jun. 13, 2022 (Year: 2008).*

(Continued)

*Primary Examiner* — Matthew T Martin
*Assistant Examiner* — Jared Hansen
(74) *Attorney, Agent, or Firm* — Lerner David LLP

(57) ABSTRACT

The present invention relates to an active material analysis apparatus for analyzing an active material of a battery. An active material analysis apparatus of the present invention may comprise: a lower plate at which an electrode is located; an upper plate which is coupled to the lower plate with the electrode disposed therebetween; a sealing member positioned at a joint part between the upper plate and the lower plate; and a coupling member for coupling the upper plate and the lower plate, wherein: the upper plate includes an opening provided to allow a light source to be radiated to the electrode; an electrolyte is filled in a space between the upper plate and the lower plate; the opening is covered by glass; and the upper plate faces a liquid surface formed by the electrolyte and is positioned at a position higher than that of the liquid surface.

6 Claims, 4 Drawing Sheets

(51) Int. Cl.
  *H01M 4/525* (2010.01)
  *H01M 10/48* (2006.01)
  *G01N 21/65* (2006.01)
  *H01M 10/44* (2006.01)

(52) U.S. Cl.
  CPC ......... *H01M 4/525* (2013.01); *H01M 10/425*
  (2013.01); *H01M 10/44* (2013.01); *H01M*
  *10/48* (2013.01)

(58) Field of Classification Search
  CPC ............... H01M 10/48; H01M 10/425; H01M
  10/4285; Y02E 60/10
  See application file for complete search history.

(56) References Cited

U.S. PATENT DOCUMENTS

| | | | |
|---|---|---|---|
| 2013/0313471 | A1 | 11/2013 | Endo et al. |
| 2014/0093052 | A1* | 4/2014 | Chupas ............ G01N 23/20025 378/208 |
| 2014/0346052 | A1 | 11/2014 | Ozaki et al. |
| 2016/0036011 | A1* | 2/2016 | Jung ................. H01M 10/0525 29/623.2 |
| 2016/0185600 | A1 | 6/2016 | Sotowa et al. |
| 2016/0322677 | A1 | 11/2016 | Jung et al. |
| 2017/0074821 | A1 | 3/2017 | Ushio et al. |

FOREIGN PATENT DOCUMENTS

| | | |
|---|---|---|
| CN | 107487064 A | 12/2017 |
| JP | H10502740 A | 3/1998 |
| JP | 2012159311 A | 8/2012 |
| JP | 2013113620 A | 6/2013 |
| JP | 2014146466 A | 8/2014 |
| JP | 5661901 B1 | 1/2015 |
| JP | 2015099762 A | 5/2015 |
| JP | 2015216042 A * | 12/2015 |
| KR | 20060042476 A | 5/2006 |
| KR | 20080012438 A | 2/2008 |
| KR | 20120005349 U | 7/2012 |
| KR | 101274730 B1 | 6/2013 |
| KR | 20150009237 A | 1/2015 |
| KR | 20150047796 A * | 5/2015 |
| KR | 20160129612 A | 11/2016 |
| KR | 20180088497 A | 8/2018 |

OTHER PUBLICATIONS

JP2015216042A, machine English translation Hirakawa Takumi; Yonezawa Makoto, "Method for Observing Lithium Ion Battery, Test Lithium Ion Battery, and Method for Manufacturing the Same", accessed from https://worldwide.espacenet.com/ Date: Jun. 13, 2022 (Year: 2015).*

KR20150047796A, Shim, et al., "In Situ Coin Cell With Slit for Measuring X-Ray Diffraction, and Holder Therof" machine English translation retrieved from https://worldwide.espacenet.com/ Date: Jan. 4, 2023 (Year: 2015).*

International Search Report for PCT/KR2019/012090 dated Jan. 15, 2020; 2 pages.

Extended European Search Report including Written Opinion for Application No. EP19862453.8 dated Jan. 11, 2021, 7 pgs.

* cited by examiner

[FIG. 1]
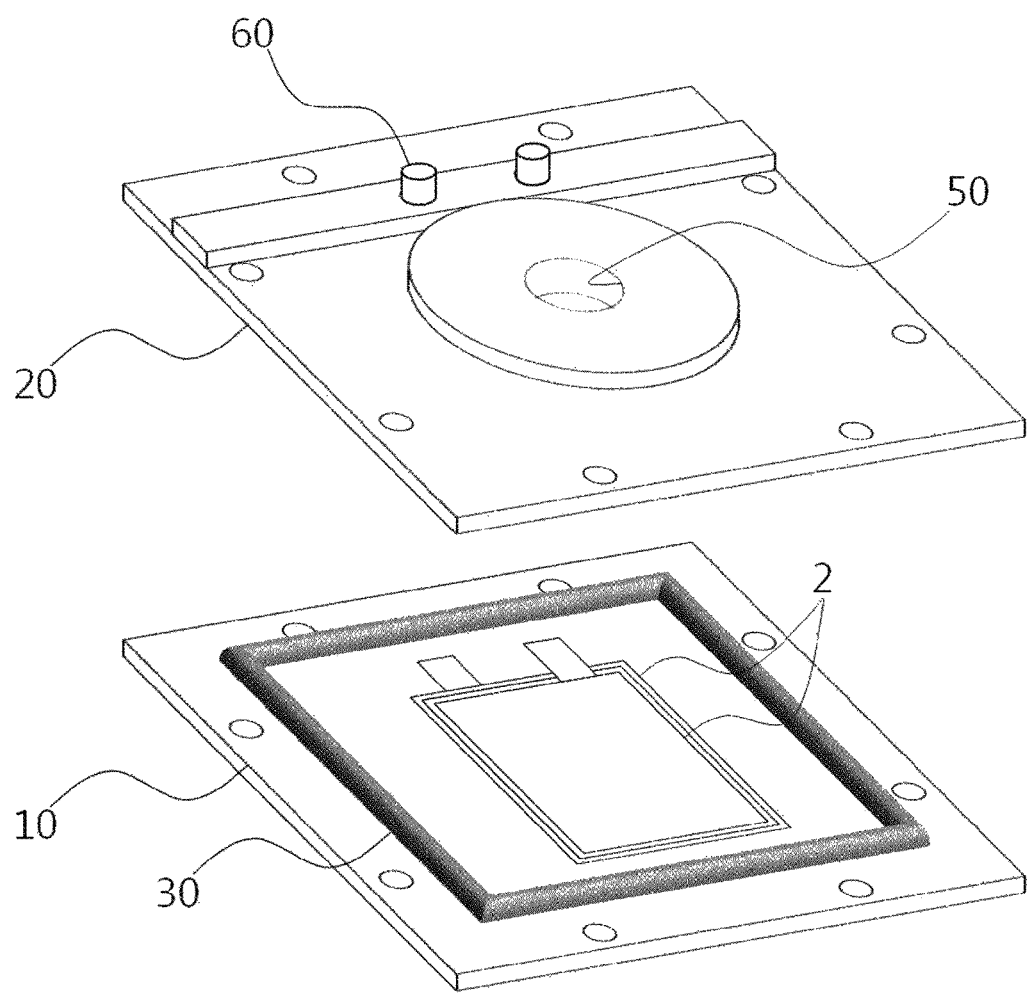

[FIG. 2]
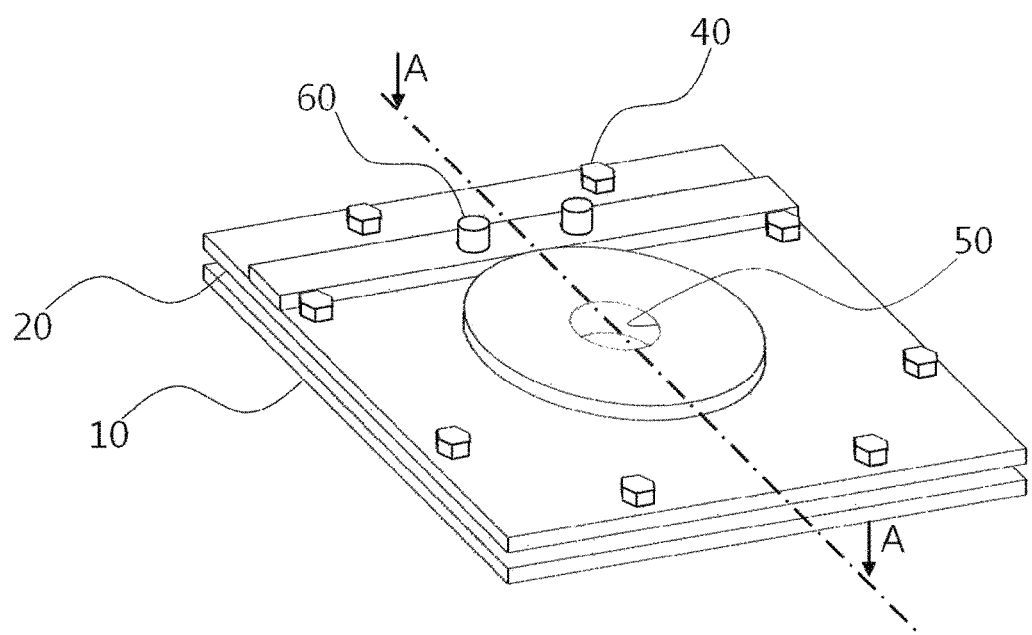
[FIG. 3]
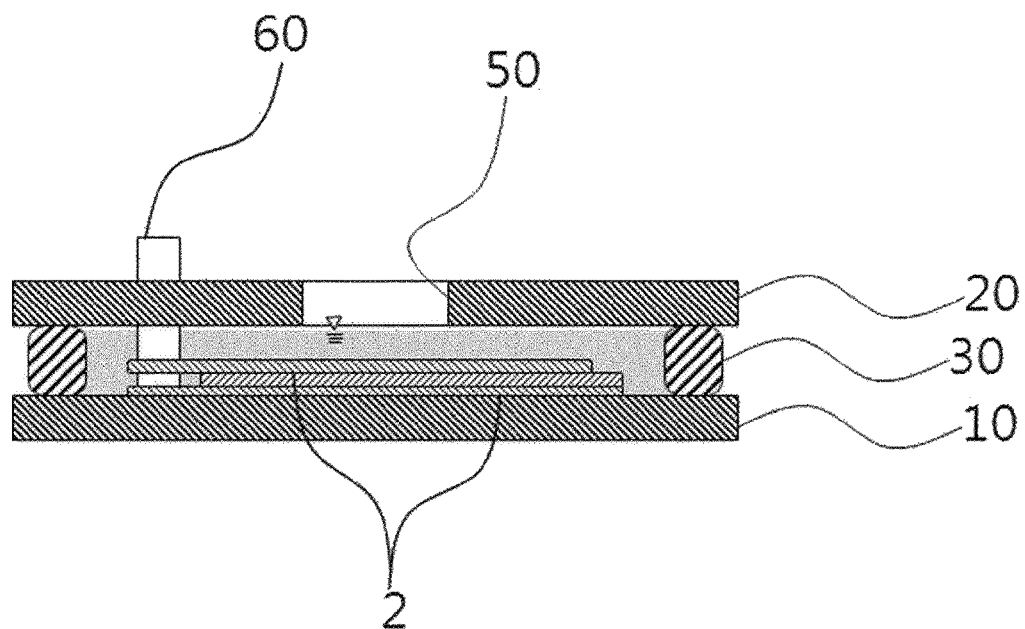

[FIG. 5]
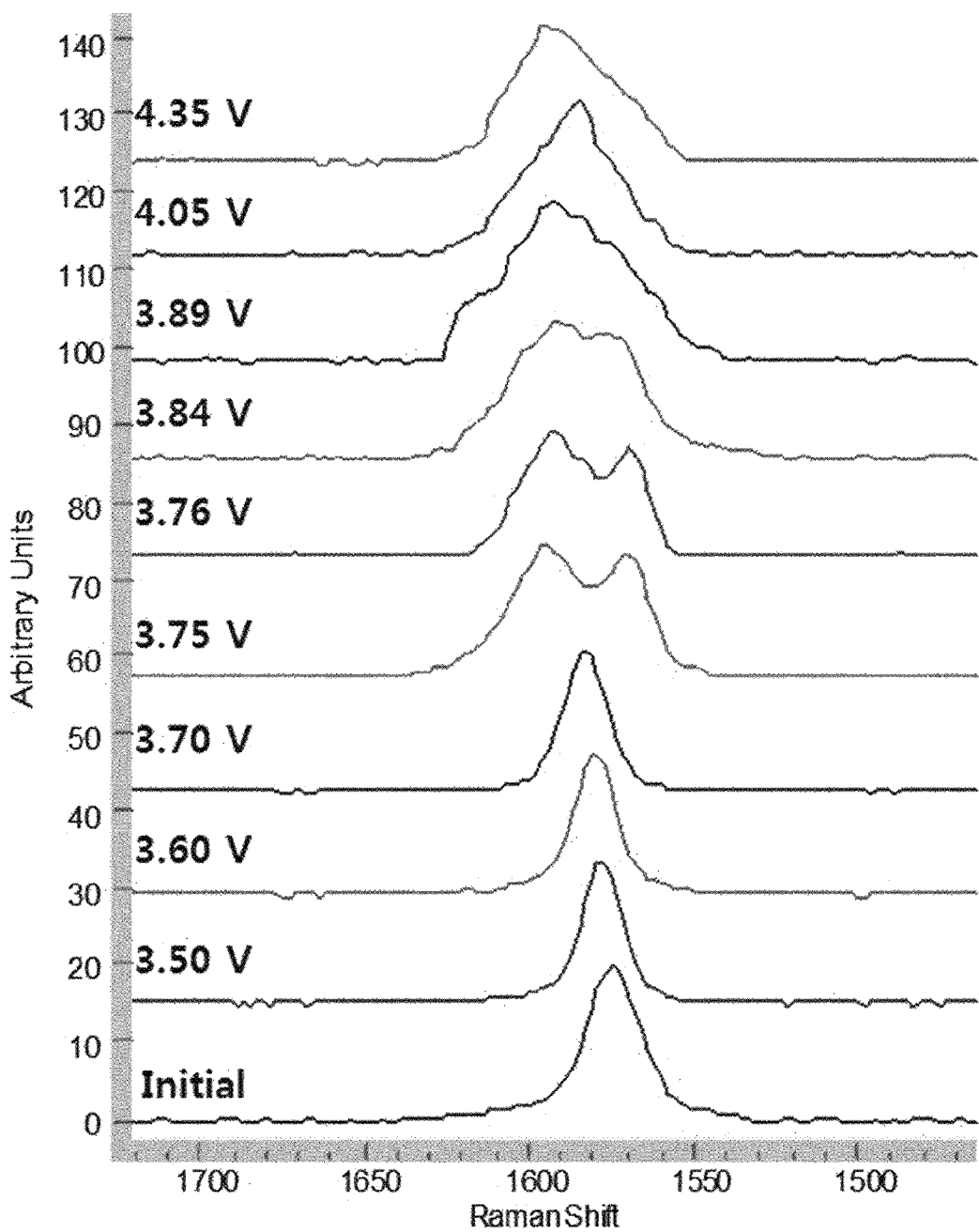

ACTIVE MATERIAL ANALYSIS APPARATUS

CROSS-REFERENCE TO RELATED APPLICATIONS

This application is a national phase entry under 35 U.S.C. § 371 of International Patent Application No. PCT/KR2019/012090 filed on Sep. 18, 2019, published in Korean, which claims the benefit of priorities based on Korean Patent Application No. 10-2018-0111967 filed on Sep. 19, 2018 and Korean Patent Application No. 10-2019-0114218 filed on Sep. 17, 2019, the entire contents of which are hereby incorporated by reference herein.

TECHNICAL FIELD

The present invention relates to a device for analyzing an active material of a battery, and more concretely to a device for analyzing a structure of the active material in an electrode of the battery during charging or discharging.

BACKGROUND ART

The main constituent material of a secondary battery may include an active material, a binder, a conductive material, pores, and the like, and a structure of the active material among them is highly related to efficiency of the battery. Specifically, the active material may exhibit a sudden phase transition of the crystal structure according to change in a volume due to repeated charging and discharging, which results in a slow reaction, a low output of the battery, and a short lifetime.

In order to improve a capacity of the secondary battery including a lithium-ion battery (Li-ion battery) and the like, there exist various methods of evaluating a structure of the main active material. Among conventional methods for analyzing the active material, the Raman spectroscopy has been widely used by virtue of an advantage which can measure local sites and has an easy measurement method. These general evaluation methods are to evaluate the active material by opening the battery charged and discharged at a specific voltage. However, there is a problem in that it is difficult to perform a direct measurement due to a stability problem and to analyze the structure of the active material in real time.

Therefore, in order to improve an efficiency of the secondary battery, it is essential to develop a device for analyzing a structure of the active material in real time.

DETAILED DESCRIPTION OF THE INVENTION

Technical Problem

The present invention relates to a device for analyzing an active material of a battery, and more concretely is to provide a device for analyzing a structure of the active material in an electrode of the battery during charging or discharging.

Technical problems that the present invention seeks to achieve are not limited to the technical problems mentioned above, and other technical problems not mentioned above will be clearly understood by a person who has an ordinary knowledge in the technical field to which the present invention belongs from the following description.

Technical Solution

A device for analyzing an active material according to the present invention comprises: a lower or first plate on which an electrode is placed; an upper or second plate coupled to the lower plate and having the electrode interposed therebetween; a sealing member positioned at a seam portion of the upper plate and the lower plate; and a coupling member for coupling the upper plate and the lower plate, wherein the upper plate includes an opening through which a light source can be irradiated to the electrode, an electrolyte is filled in a space between the upper plate and the lower plate, the opening is covered with a glass, and the upper plate is located at a position which is opposite to or confronts a liquid level or upper liquid surface formed by the electrolyte and is higher than the liquid level.

Effects of the Invention

According to the method of the present invention, since the active material can be analyzed in real time during the synthesis process or the charge/discharge process of a secondary battery material, it is possible to establish analysis and improvement of the mechanism of reaction, degradation and safety inhibition of the electrode material. In addition, the capacity of the secondary battery may be significantly improved as the utilization thereof is enhanced through an optimum structure design for the active material.

BRIEF DESCRIPTION OF DRAWINGS

FIG. 1 is a perspective view showing that a device for analyzing an active material according to the present invention is decomposed.

FIG. 2 is a perspective view showing that a device for analyzing an active material according to the present invention is assembled.

FIG. 3 shows a cross-sectional view taken along the line A-A of FIG. 2.

FIG. 5 is a graph showing a Raman spectrum result for an active material in real time.

BEST FORM FOR IMPLEMENTATION OF THE INVENTION

Figure 4:
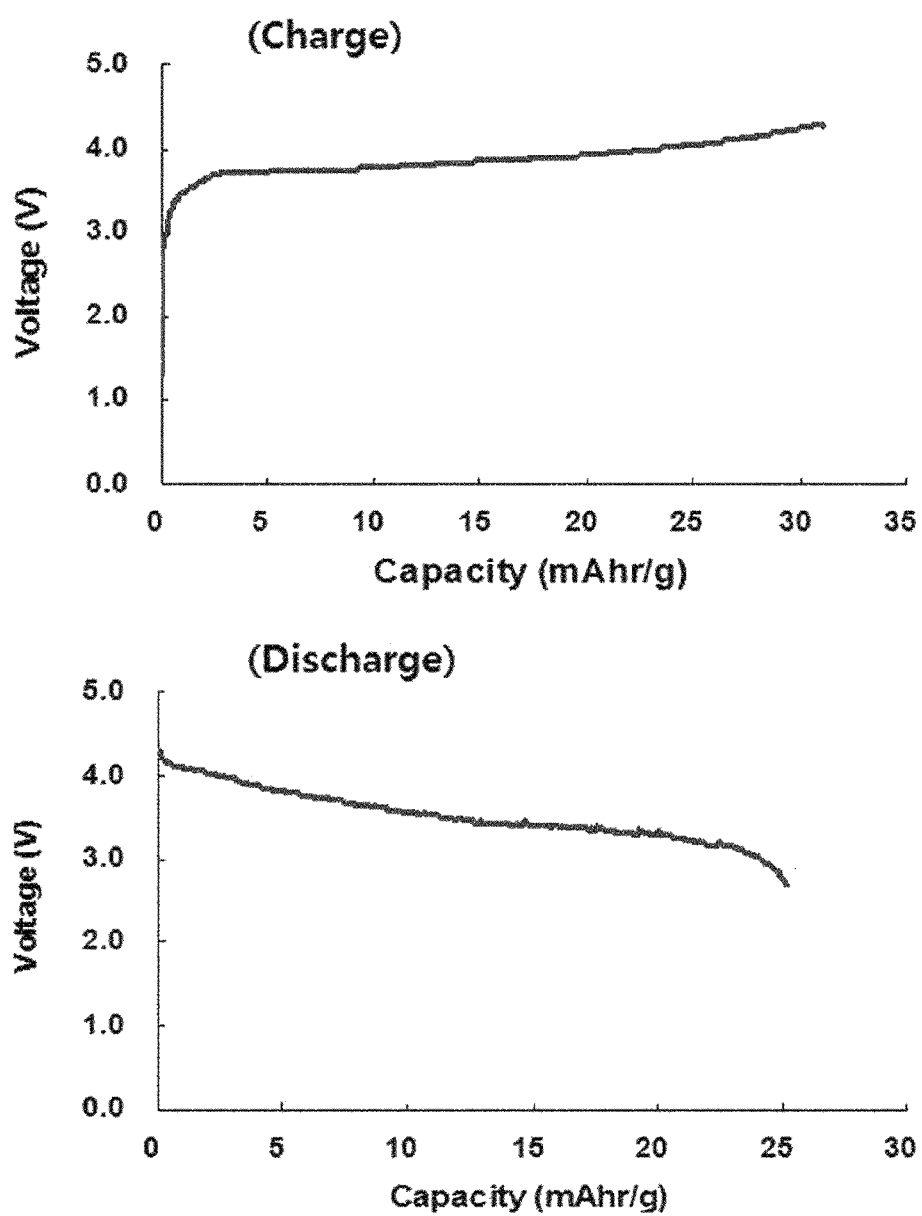
FIG. 4 is graphs showing charge and discharge curves.

A device for analyzing an active material according to the present invention comprises: a lower plate on which an electrode is placed; an upper plate coupled to the lower plate and having the electrode interposed therebetween; a sealing member positioned at a seam portion of the upper plate and the lower plate; and a coupling member for coupling the upper plate and the lower plate, wherein the upper plate includes an opening through which a light source can be irradiated to the electrode, an electrolyte is filled in a space between the upper plate and the lower plate, the opening is covered with a glass, and the upper plate is located at a position which is opposite to a liquid level formed by the electrolyte and is higher than the liquid level.

The device for analyzing the active material according to the present invention further comprises a charge/discharge terminal electrically connected to the electrode, wherein the charge/discharge terminal penetrates the upper plate so that a lower end of the charge/discharge terminal can be in contact with the electrode or a lead tab extending from the electrode.

In the device for analyzing the active material according to the present invention, the upper plate and the lower plate may be formed of at least one selected from the group consisting of Teflon, polyimide, and high-density polyethylene (HDPE).

In the device for analyzing the active material according to the present invention, the active material of the electrode may include LTO ($Li_{14}Ti_{15}O_{12}$), NMC ($Li[CoMnNi]O_2$), LCO ($LiCoO_2$), NCM ($Li[Ni, Co, Mn]O_2$), NCA ($Li[Ni, Co, Al]O_{-2}$), LMO ($LiMn_2O_4$), LFP ($LiFePO_4$) or LCP (lithium cobalt phosphate).

In the device for analyzing the active material according to the present invention, the active material of the electrode may include graphite, Si/Graphite, Si-Oxide, Si base, Li, Si—Sn, $Li_xM_yN_2$, $Li_{0.6}CoOO_{0.4}N$, Ti or V.

In the device for analyzing the active material according to the present invention, an interval between the upper plate and the lower plate may be adjusted by the coupling member.

It is possible to analyze change in a structure of the active material in real time during charging or discharging using the device for analyzing the active material according to the present invention.

FORM FOR IMPLEMENTATION OF THE INVENTION

As the present invention allows for various changes and embodiments, particular embodiments will be illustrated and described in detail in the detailed description of the specification. However, it should be understood that the above description is not intended to limit the present invention to the particular embodiments, but includes all conversions, equivalents or substitutes included in the spirit and scope of the present invention. In the following description of the present invention, if it is determined that the detailed description of the related known technology may obscure the gist of the present invention, the detailed description thereof will be omitted.

When a constitutive element herein is referred to as being "interlinked" or "connected" to another constitutive element, it is to be understood that the constitutive element may be directly interlinked or connected to another constitutive element or the other constitutive element may exist therebetween.

A singular expression include plural expressions unless otherwise specified.

As used herein, the expressions such as "comprises", "include" or "have" refers to the presence of features, numerical values, steps, operations, constitutive elements, parts, or combinations thereof, which are described in the specification, but they do not exclude the possibility that other features, numerical figures, steps, operations, constitutive elements, parts or combinations thereof, which are not mentioned in the specification, are present or added.

Hereinafter, a device for analyzing an active material according to an embodiment of the present invention will be described in more detail.

As shown in FIGS. 1 and 2, a device for analyzing an active material according to the present invention may comprise a lower plate 10 on which an electrode 2 is placed; an upper plate 20 coupled to the lower plate 10 and having the electrode 2 interposed therebetween; a sealing member 30 positioned at a seam portion of the upper plate 20 and the lower plate 10 and completely extending around an outer periphery of the electrode 2; and a coupling member 40 for coupling the upper plate 20 and the lower plate 10.

An electrolyte may be filled in a space between the upper plate 20 and the lower plate 10, and the upper plate 20 may include an opening 50 through which a light source can be irradiated to the electrode 2, and the opening 50 may be covered with a glass.

According to an embodiment, a Raman spectrum analysis may be performed through the opening 50 of the upper plate 20, that is, the portion made of the glass. The opening 50 (the portion made of the glass) may be formed in the shape of a transparent window at a part of the center of the upper plate 20 and the position and shape thereof may be appropriately modified. For example, the opening 50 may be formed at a position opposite to the electrode 2 located between the upper plate 20 and the lower plate 10.

The device for analyzing the active material according to the present invention may accommodate the electrode 2 in a space formed by coupling the upper plate 20 and the lower plate 10 to face each other. That is, the upper plate 20 and the lower plate 10 may be coupled to each other with the electrode 2 interposed therebetween.

Therefore, the electrode 2 may be arranged in a sealed space formed by the coupling of the upper plate 20 and the lower plate 10. A connection site of the upper plate 20 and the lower plate 10 may be provided with a sealing member 30 to minimize exposure to moisture. The sealing member 30 may be, for example, an o-ring. The upper plate 20 and the lower plate 10 may be coupled to each other by a coupling member 40, and the coupling member 40 may be, for example, an adjustment screw. The electrolyte may be filled in a space between the upper plate 20 and the lower plate 10.

The space into which the electrode 2 is accommodated may be made by a groove formed in the upper plate 20 or the lower plate 10, or by an interval formed between the upper plate 20 and the lower plate 10 due to the thickness of the sealing member 30.

By using the device for analyzing the active material according to the present invention, it is possible to analyze change in the structure of the active material during charging or discharging for a polymer battery in the form of a pouch. According to an embodiment, the electrode 2 of the polymer battery in the mono-cell type is accommodated inside the device for analyzing the active material, and the electrolyte may be filled in the space between the upper plate 20 and the lower plate 10. The charge/discharge terminal 60, which may be electrically connected to the electrode 2 penetrates the upper plate 20 so that a lower end of the charge/discharge terminal 60 can contacts the electrode 2 or a lead tab extending from the electrode 2.

That is, the lower end of the charge/discharge terminal 60 may protrude further downward than the upper plate 20, and the upper end of the charge/discharge terminal 60 may protrude further upward than the upper plate 20. The charge/discharge terminal 60 may be a conductive material.

As shown in FIG. 3, the electrode 2 includes a cathode and an anode, and the electrode 2 may be located between the upper plate 20 and the lower plate 10 in the stacked order of [cathode]-[separation membrane]-[anode]. The charge/discharge terminal 60 may be configured to be electrically connected to the cathode and the anode, respectively. For example, two charge/discharge terminals 60 may be provided.

In addition, the charge/discharge terminal 60 may contact the lead tab of the electrode 2. The charge/discharge terminal 60 may be in direct contact with the electrode 2, but may be in contact with the lead tab that is electrically connected to the electrode 2 and protrudes from the electrode 2.

An electrical cable connected to a charge/discharge device (not shown) may be connected to an upper end of the charge/discharge terminal 60 in the upper plate 20, and thus electric source may be connected to the electrode 2. As the charge/discharge terminal 60 is located on the upper plate 20, leakage of the electrolyte can be minimized.

In other words, if the charge/discharge terminal 60 penetrates the structure arranged at a lower position than a liquid level formed by the electrolyte and electrically connects the electrode 2 and the charge/discharge device, there is a risk of leakage of the electrolyte by a hole through which the charge/discharge terminal 60 passes. However, according to the present invention, a location at the upper plate 20 through which the charge/discharge terminal 60 for connecting to the electrode 2 penetrates is positioned higher than (i.e., overlies and is spaced apart from) the liquid level or upper liquid surface formed by the electrolyte, thereby preventing the leakage of the electrolyte.

According to an embodiment, the upper plate 20 and the lower plate 10 of the device for analyzing the active material may be formed of one or more materials selected from the group consisting of Teflon, polyimide and high-density polyethylene (HDPE) which has a low electrical conductivity. Such a material can prevent electric power charged or discharged to the electrode 2 from being applied to the upper plate 20 or the lower plate 10 and is chemically stable, whereby it may not be necessary to construct an additional insulating sheet or the like.

According to an embodiment, the active material of the electrode 2 may include LTO ($Li_{14}Ti_{15}O_{12}$), NMC (Li[CoMnNi] $O_2$), LCO ($LiCoO_2$), NCM (Li [Ni, Co, Mn] $O_2$), NCA (Li [Ni, Co, Al] $O_{-2}$), LMO ($LiMn_2O_4$), LFP ($LiFePO_4$) or LCP (lithium cobalt phosphate).

In addition, the active material may include carbon, silicon (Si) based material, nitride, titanium (Ti) based material or vanadium (V) based material. Specifically, for example, the active material may include graphite, Si/Graphite, Si-Oxide, Si base, Li, Si—Sn, $Li_xM_yN_2$, $Li_{0.6}CoOO_{0.4}N$, Ti or V.

On the other hand, the present invention can be variously modified and changed according to a situation in which the present invention is implemented, without being limited to the above-description. For example, the Raman spectrum analysis may be carried out while performing the charge and discharge by placing the battery of a pouch type including the electrode 2 on the lower plate 10, coupling the upper plate 20 and the lower plate 10 without filling the electrolyte therebetween, and connecting the charge and discharge device to the charge/discharge terminal 60 of the upper plate 20.

The coupling member 40 may be a bolt. The upper plate 20 may be provided with a through hole through which the coupling member 40 can penetrate. The lower plate 10 may be provided with an insertion hole or an insertion groove through which the coupling member 40 can be inserted at a position apposite to the through hole of the upper plate 20. The through hole, the insertion hole or the insertion groove may be provided in plurality. A thread is formed on an inner circumferential surface of the insertion groove or the insertion hole, and the insertion groove or the insertion hole may be coupled with the coupling member 40 by the thread. The thread is not formed on the inner circumferential surface of the through hole, so the coupling member 40 may smoothly slide when penetrating the through hole.

The plurality of through holes may be formed at positions adjacent to an edge of the upper plate 20. The insertion hole or the insertion groove may be formed at a peripheral edge farther than the position in which a sealing member 30 is arranged on the lower plate 10 or located between the peripheral edge and the sealing member.

By using the device for analyzing the active material according to the present invention, change in the structure of the active material during charging or discharging can be analyzed in real time, and thus it can be usefully applied to research for developing the battery.

Hereinafter, examples of the present invention will be described in detail so that a person who has an ordinary knowledge in the technical field to which the present invention belongs can carry out the invention. However, the present invention may be embodied in various different ways without being limited to the examples described herein.

Example 1

An upper plate and a lower plate were made of a Teflon material. Specifically, an opening of the center of the upper plate was formed of a circular glass for spectroscopic measurement, and a sealing member was arranged at a connection site between the upper plate and the lower plate.

A polymer electrode consisting of $LiCoO_2$ as an anode and Si/Graphite as a cathode was placed on the lower plate, and coupled with a coupling member to laminate the lower plate and the upper plate.

Experimental Example 1: Analysis of Change in Structure of an Active Material

In order to analyze change in the structure of the active material of the battery during charging and discharging, a current was applied to the polymer electrode of Example 1. A Raman spectrum was obtained through the opening covered with a glass on the upper plate during charging and discharging of the battery using the Raman spectroscopy (almega XR manufactured by Thermo, Laser: 532 nm, Objective: 50× (Long working distance)) to check change in the structure of the cathode active material in real time.

The charge and discharge curves were shown in FIG. 4, and the Raman spectrum results were shown in FIG. 5.

As shown in FIG. 4, it can be confirmed that the G-band in the initial sample is indicated at 1575 cm$^{-1}$, whereas when the voltage is increased to 3.70 V, a blue shift phenomenon of the G-band appears. This result is caused by the gradual intercalation of Li$^+$ between the graphene sheet layer structures of graphite, whereby the interval between the graphene sheets widens.

Further, it can be seen that at the voltage of 3.75 V, the G-band of graphite is divided into two bands of 1570 ($E_{2g2(i)}$ and 1595 cm$^{-1}$ ($E_{2g2(b)}$), which means that Li$^+$ is the band that appears as it is gradually intercalated between the adjacent graphene sheets of graphite.

In addition, at the voltage of 3.84 V or more, the intensity of the $E_{2g2(i)}$ and $E_{2g2(b)}$ bands is gradually decreased and a new band appears at 1588 cm$^{-1}$, which indicates that Li$^+$ is inserted into almost all graphene sheets.

As described above, change in the structure of the active material can be confirmed simply and easily in real time during charging and discharging of the battery using the device for analyzing the active material according to the present invention.

Since the specific constitutions of the present invention have been described in detail, it is apparent to those skilled in the relevant art that such a concrete description is merely a preferred embodiment, and thus the scope of the present invention is not limited thereto. Thus, the substantial scope of the present invention will be defined by the appended claims and their equivalents.

INDUSTRIAL APPLICABILITY

According to the method of the present invention, since the active material can be analyzed in real time during the synthesis process or the charge/discharge process of a secondary battery material, it is possible to establish analysis and improvement of the mechanism of reaction, degradation and safety inhibition of the electrode material. In addition, the capacity of the secondary battery may be significantly improved as the utilization thereof is enhanced through the optimum structure design for the active material.

What is claimed is:

1. A device for analyzing an active material of an electrode, comprising:
    a first plate configured to receive the electrode placed thereon, the first plate defining a first largest planar surface;
    a second plate coupled to the first plate and configured to have the electrode interposed between the first plate and the second plate, the second plate defining a second largest planar surface;
    an electrode disposed between the first plate and the second plate, the electrode defining a third largest planar surface parallel to the first and second largest planar surfaces;
    a charge/discharge terminal electrically connected to the electrode, the charge/discharge terminal penetrating the second plate and extending in a vertical direction perpendicular to the first, second, and third largest planar surfaces so that a lower end of the charge/discharge terminal contacts the electrode or a lead tab extending from the electrode;
    a sealing member positioned at a seam portion of the first plate and the second plate, the sealing member sealing the first plate and the second plate to one another at the seam portion, thereby defining a sealed space between the first plate and the second plate that is sealed from an outside of the device, the sealing member completely extending around an outer periphery of the electrode;
    an electrolyte filled within the sealed space between the first plate and the second plate, the electrolyte forming an upper liquid surface confronting the second plate; and
    a coupling member configured to couple the first plate and the second plate to one another, the coupling member being configured to adjust a distance between the first plate and the second plate,
    wherein the second plate includes an opening through which a light source can be irradiated to the electrode inside of the sealed space, and the opening is covered with a glass, and
    wherein a location at which the charge/discharge terminal penetrates the second plate overlies and is spaced apart from the upper liquid surface of the electrolyte in the vertical direction.

2. The device according to claim 1, wherein the first plate and the second plate are each formed of at least one selected from the group consisting of: polytetrafluoroethylene (PTFE), polyimide, and high-density polyethylene (HDPE).

3. The device according to claim 1, wherein the active material of the electrode includes LTO ($Li_{14}Ti_{15}O_{12}$), NMC (Li [CoMnNi] $O_2$), LCO ($LiCoO_2$), NCM (Li [Ni, Co, Mn] $O_2$), NCA (Li [Ni, Co, Al] $O_{-2}$), LMO ($LiMn_2O_4$), LFP ($LiFePO_4$), or LCP (lithium cobalt phosphate).

4. The device according to claim 1, wherein the active material of the electrode includes graphite, Si/Graphite, Si-Oxide, Si base, Li, Si—Sn, $Li_xM_yN_2$, $Li_{0.6}CoOO_{0.4}N$, Ti, or V.

5. A method for analyzing change in a structure of the active material of the electrode in real time during charging or discharging of the electrode using the device according to claim 1.

6. The device according to claim 1, wherein the second plate has a through hole configured to receive penetration of the coupling member therethrough, the first plate has an insertion hole or an insertion groove configured to receive insertion therein of the coupling member at a position opposite to the through hole of the second plate, and the insertion hole or the insertion groove is located between a peripheral edge of the first plate and the sealing member.

* * * * *